(12) United States Patent
Khojastepour et al.

(10) Patent No.: US 12,436,219 B2
(45) Date of Patent: Oct. 7, 2025

(54) RECONFIGURABLE INTELLIGENT SURFACE BEAMFORMING

(71) Applicant: NEC Laboratories America, Inc., Princeton, NJ (US)

(72) Inventors: Mohammad Khojastepour, Lawrenceville, NJ (US); Nariman Torkzaban, College Park, MD (US)

(73) Assignee: NEC Corporation, Tokyo (JP)

( * ) Notice: Subject to any disclaimer, the term of this patent is extended or adjusted under 35 U.S.C. 154(b) by 488 days.

(21) Appl. No.: 17/948,751

(22) Filed: Sep. 20, 2022

(65) Prior Publication Data

US 2023/0086903 A1 Mar. 23, 2023

Related U.S. Application Data

(60) Provisional application No. 63/246,899, filed on Sep. 22, 2021.

(51) Int. Cl.
*G01S 3/14* (2006.01)
*H04B 7/06* (2006.01)
*G01S 7/02* (2006.01)

(52) U.S. Cl.
CPC .............. *G01S 3/14* (2013.01); *H04B 7/0617* (2013.01); *G01S 7/02* (2013.01)

(58) Field of Classification Search
None
See application file for complete search history.

(56) References Cited

U.S. PATENT DOCUMENTS

| | | | |
|---|---|---|---|
| 2021/0068163 A1* | 3/2021 | Lee ............... | H04W 74/006 |
| 2022/0021125 A1* | 1/2022 | Baligh ............ | H01Q 21/06 |
| 2022/0052764 A1* | 2/2022 | Medra ............. | H04B 10/614 |
| 2023/0055627 A1* | 2/2023 | Balasubramanian ...... G01S 5/0268 |
| 2023/0176174 A1* | 6/2023 | Penna ............. | H01Q 3/46 342/451 |
| 2023/0289564 A1* | 9/2023 | Kim .............. | G06N 3/0464 |

OTHER PUBLICATIONS

Liaskos et al., "A New Wireless Communication Paradigm through Software-Controlled Metasurfaces", IEEE Communications Magazine, Sep. 2018, pp. 162-169.
Love et al., "Grassmannian Beamforming for Multiple-Input Multiple-OutputWireless Systems", IEEE transactions on information theory, Oct. 1, 20034, pp. 2618-2622.
Huang et al., "Reconfigurable Intelligent Surfaces for Energy Efficiency in Wireless Communication", IEEE Transactions on Wireless Communications, vol. 18, No. 8, Aug. 2019, pp. 4157-4170.

* cited by examiner

*Primary Examiner* — Marcus E Windrich
(74) *Attorney, Agent, or Firm* — Joseph Kolodka

(57) ABSTRACT

Reconfigurable surfaces and methods for configuring surfaces include measuring properties of one or more incident signals at a configurable cell of a surface. A beam forming pattern for the surface is determined based on the measured properties of the one or more incident signals. Parameters of the configurable cell are set to implement the beam forming pattern in the surface.

19 Claims, 4 Drawing Sheets

RECONFIGURABLE INTELLIGENT SURFACE BEAMFORMING

RELATED APPLICATION INFORMATION

This application claims priority to 63/246,899, filed on Sep. 22, 2021, incorporated herein by reference in its entirety.

BACKGROUND

Technical Field

The present invention relates to wireless communications, and, more particularly, to reflective surfaces used to enhance wireless communications links.

Description of the Related Art

Microwave frequencies, such as in the millimeter-wave range, have an abundance of available bandwidth, but are susceptible to high path-loss due to scattering, diffraction, reflections, and obstacles.

SUMMARY

A method for configuring a surface includes measuring properties of one or more incident signals at a configurable cell of a surface. A beam forming pattern for the surface is determined based on the measured properties of the one or more incident signals. Parameters of the configurable cell are set to implement the beam forming pattern in the surface.

A reconfigurable surface includes a hardware processor configured to determine a beam forming pattern based on properties of one or more incident signals. A control unit is configured to set parameters of a configurable cell to implement the beam forming pattern in the surface.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
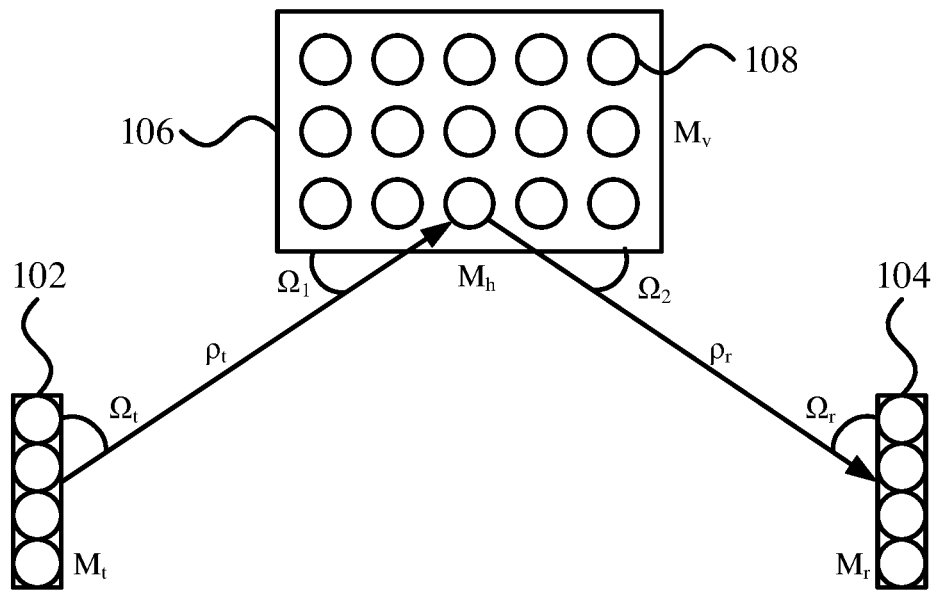
FIG. 1 is a diagram of a reconfigurable intelligent surface that reflects signals from a transmitter to a receiver, in accordance with an embodiment of the present invention.

Although millimeter-wave (mmWave) communications are largely line-of-sight and can suffer from coverage blind spots, these blind spots can be ameliorated in part by beam forming. Beamforming, for example using multiple-input-multiple-output (MIMO) antenna systems, can be used to increase the gain along a channel with high attenuation. In addition, relaying can generate constructive superposition and enhance the received signal at receiving nodes. Such systems may make use of reconfigurable intelligent surfaces to improve the capacity of mmWave communications by covering blind spots and by providing diversity reception at receiving nodes.

Reconfigurable intelligent surfaces can manipulate impinging electromagnetic waves and can artificially shape the wireless propagation environment. Because the wireless propagation environment is generally not within the control of a designer of a communications system, such systems are designed to adapt to changing environmental conditions. Reconfigurable intelligent surfaces may include a number of passive reflecting elements, arranged along planar artificial metasurfaces. Each cell of the reconfigurable intelligent surface is capable of manipulating the phase, and potentially the amplitude, of incident electromagnetic waves responsive to real-time external signals from a controller.

Reconfigurable intelligent surfaces may be programmable to flexibly modulate radio frequency (RF) signals without needing mixers, analog phase-shifters, or analog-to-digital or digital-to-analog converters. This makes it possible to design RF chain-free wireless transceivers. Whether as active transceivers or passive reflectors, reconfigurable intelligent surfaces can be deployed in a wide range of communications use-cases.

Toward that end, a reconfigurable intelligent surface can be used in a communications system between a base station and terrestrial end users. The reconfigurable intelligent surface reflects received signals from the transmitter toward the users. As a result, users that would otherwise be in blind spots of network coverage are capable of communicating to the base station through the reconfigurable intelligent surface. The reconfigurable intelligent surface may simultaneously accommodate users that are in different angular intervals, even if they are widely separated, with satisfactory quality of service.

Multi-beamforming may be used at the reconfigurable intelligent surface to design beams that include multiple disjoint lobes to cover different blind spots. Multi-beamforming may depend on the solid angle $\Omega_1$ at which an incident wave activates elements of the reconfigurable intelligent surface. The reconfigurable intelligent surface adapts to changes in $\Omega_1$.

As used herein, the terms $\mathbb{C}$ and $\mathbb{C}$, $\mathbb{R}$, indicate the sets of complex, real, and integer numbers, respectively. The term $\mathcal{CN}$ (m, $\sigma^2$) denotes a circularly symmetric complex normal distribution with mean m and variance $\sigma^2$. An a×b matrix of all ones is denoted as $1_{a,b}$, while the N×N identity matrix is $I_N$. The indicator function is denoted as $\mathbb{1}_{[a,b]}$, the 2-norm is $\|\cdot\|$, the infinity-norm is $\|\cdot\|_\infty$, |•| denotes cardinality if applied to a set and the 1-norm if applied to a vector, $\odot$ is the Hadamard product, $\otimes$ is the Kronecker product, and $A^H$ and $A_{a,b}$ denote the conjugate transpose and (a, b)$^{th}$ entry of a matrix A, respectively.

Referring now to FIG. 1, a diagram of a communications system is shown. The system includes a transmitter 102 and a receiver 104. A reconfigurable intelligent surface 106 is positioned apart from the transmitter 102 and the receiver 104. During communications, the transmitter 102 emits a radio communications signal that propagates through the environment 100 and that is received by the receiver 104. In the simplest case there may be one transmitter 102 and one receiver 104, but it should be understood that the present principles may accommodate any number of devices. For example, a single transmitter 102 may transmit to multiple different receivers 104 and there may be multiple transmitters in multiple different transmitter/receiver pairs. In some cases, a single device may at times play the role of transmitter 102 and at times the role of receiver 104.

Each of the transmitter 102 and the receiver 104 may include one or more antenna elements. The transmitter 102 and the receiver 104 may further include beam forming circuitry and logic that cause constructive and deconstructive interference within the environment, resulting in some areas of space that have relatively higher signal strength and some areas of space that have relatively lower signal strength.

The reconfigurable intelligent surface 106 reflects the incident energy of the transmitter's emissions. The reconfigurable intelligent surface 106 includes a set of passive configurable cells 108 in a uniform planar array, each may be changed in their orientation to change how the energy is reflected. In a neutral state, the reconfigurable intelligent surface 106 acts as a mirror and simply reflects incident energy, with the angle of reflection matching the angle of incidence. In other configurations, each cell 108 generates its own respective reflection, and these various reflections have their own mutual interference with one another, as well as with the original signal of the transmitter 102.

In this system, the transmitter 102 may include $M_t$ antenna elements and the receiver 104 may include $M_r$ antenna elements. The reconfigurable intelligent surface 106 include M elements arranged in an $M_h \times M_v$ grid, along the horizontal and vertical directions, respectively. The received signal $y \in \mathbb{C}^{M_r}$ at the receiver 104, as a function of the transmitted signal $x \in \mathbb{C}^{M_t}$, can be written as:

$$y=(H_r \Theta H_t)x+z$$

where z is a noise vector with each element of z being drawn from a complex Gaussian distribution $\mathcal{CN}$ (m, $\sigma^2$), and $H_t \in \mathbb{C}^{M \times M_t}$ is $H_r \in \mathbb{C}^{M \times M_r}$ are channel matrices between each party and the reconfigurable intelligent surface 106.

The reconfigurable intelligent surface 106 includes elements for which both the phase $\theta_m$ and the gain $\beta_m$ of each element m may be controlled. The diagonal matrix $\Theta \in \mathbb{C}^{M \times M}$ denotes the coefficient $\beta_m e^{j\theta_m}$ of the $m^{th}$ element in position (m, m). Assuming a line-of-sight channel model between the transmitter 102 and the reconfigurable intelligent surface 106, and between the receiver 104 and the reconfigurable intelligent surface 106, and using the directivity vectors at the transmitter 102, the receiver 104, and the reconfigurable intelligent surface 106, the effective channel matrices may be written as:

$$H_r = a_{M_r}(\Omega_r) \rho_r a_M{}^H(\Omega_2)$$

$$H_t = a_{M_r}(\Omega_1) \rho_t a_{M\_t}{}^H(\Omega_t)$$

where $a_M(\Omega)$ is the array response vector of a reconfigurable intelligent surface with elements in a uniform planar array, $\Omega_t$ and $\Omega_2$ are the solid angles of departure (AoDs) of the transmitted beams from the transmitter 102 and the reconfigurable intelligent surface 106, respectively, and $\Omega_r$ and $\Omega_1$ are the solid angles of arrival (AoAs) of the received beams at the receiver 104 and the reconfigurable intelligent surface 106, respectively.

The gain of the line-of-sight paths from the transmitter 102 to the reconfigurable intelligent surface 106 and from the reconfigurable intelligent surface 106 to the receiver 104 are denoted by $\rho_t$ and $\rho_r$, respectively. An arbitrary solid angle $\Omega$ specifies a pair of elevation and azimuth angles ($\phi$, $\theta$). Therefore, $\Omega_a = [\phi_a, \theta]$, $a \in \{1,2, t, r\}$. Assuming no pairing between the elements of the reconfigurable intelligent surface 106, $\Theta$ will be a diagonal matrix specified by $$\Theta = \text{diag}\{[\beta_1 e^{j\Theta_1}, \ldots, \beta_M e^{(j\Theta_M)}]\}$$

where $\beta_i = [0,1]$ and $\theta_i = [0, 2\pi]$. The contribution of the reconfigurable intelligent surface 106 to the channel matrix, when excited from incident angle $\Omega_1$, for a receiver at a solig angle $\Omega$ is given by:

$$\Gamma(\Omega_1, \Theta, \Omega) = a_M{}^H(\Omega) \Theta a_m(\Omega_1) = a_M{}^H(\Omega) \lambda$$

where $\lambda \in \mathbb{C}^M$ may be defined as $\lambda = \Theta a_M(\Omega_1)$.

For a reconfigurable intelligent surface 106 having $M_v \times M_h$ elements in a uniform planar array at the x-z plane, where $M = M_v M_h$ and the z-axis corresponds to the horizon, where $d_z$ and $d_x$ denote the distance between the antenna elements in the z and x axes respectively, the array response vector can be found at a solid angle $\Omega$ as:

$$a_M(\Omega) = \left[1, e^{\frac{j2\pi}{\lambda} r_\Omega r_1}, \ldots, e^{\frac{j2\pi}{\lambda} r_\Omega r_{M-1}}\right]^T \in \mathbb{C}^M$$

where $r_\Omega = [\cos \phi \cos \theta, \cos \phi \sin \theta, \sin \phi]$ and $r_m = (m_h d_x, 0, m_v d_z)$ to respectively denote the direction corresponding to the solid angle $\Omega$ and the location of the $m^{th}$ element of the reconfigurable intelligent surface 106 corresponding to an antenna placed at position ($m_v$, $m_h$), with $m = m_v M_h + m_h$.

A transformation of variables is used herein where, for a solid angle $\Omega = [\phi, \theta]$, $\psi = [\xi, \zeta]$:

$$\xi = \frac{2\pi d_z}{\lambda} \sin \phi$$

$$\zeta = \frac{2\pi d_x}{\lambda} \sin \theta \cos \phi$$

Thus:

$$a_M = d_{M_v}(\xi) \otimes d_{M_h}(\zeta) \in \mathbb{C}^M$$

where $d_M$ denotes the directivity vector of the reconfigurable intelligent surface 106. The directivity vectors $d_{M_a}$, for $a \in \{v, h\}$, are defined as:

$$d_{M_a}(\psi_a) = [1, e^{j\psi_a}, \ldots, e^{j(M_a-1)\psi_a}]^T \in \mathbb{C}^{M_a}$$

where $\psi_v = \xi$ and $\psi_h = \zeta$. Letting $\mathcal{B}$ be the angular range of $\Omega$:

$$\mathcal{B} \doteq [-\phi^B, \phi^B) \times [-\theta^B, \theta^B)$$

Then $\mathcal{B}^\psi$ is the angular range under interest in the ($\xi$, $\zeta$) domain:

$$B^\psi \doteq [-\xi^B, \xi^B) \times [-\zeta^B, \zeta^B)$$

To further simplify the terms herein, $$d_x = d_z = \lambda_2, \phi^B = \frac{\pi}{4}, \text{ and } \theta^B = \frac{\pi}{2}.$$

Thus:

$$\psi_v \in \left[-\frac{\pi\sqrt{2}}{2}, \frac{\pi\sqrt{2}}{2}\right)$$

and $\psi_h \in [-\pi, \pi)$. To formalize the variable transformation, a transformation operator may be defined as $\tau: \mathcal{B} \to \mathcal{B}^\psi$ as $\tau([\phi, \theta]) = [\xi, \zeta]$.

For a uniform planar array arrangement of the reconfigurable intelligent surface 106, excited by an emission from solid angle $\Omega_1$, the reference gain at any direction $\Omega$ is:

$$|\Gamma(\Omega_1, \Theta, \Omega)|^2 = \left|\sum_{m=0}^{M-1} \theta_{m,m} e^{j(\tau(\Omega_1) - \tau(\Omega))m}\right|$$

The gain of a uniform planar array with the beamforming matrix $\Theta$ at any solid angle $\Omega$ is equal to that of a uniform planar array excited from an AoA $\Omega_1$ with parameter matrix $\text{diag}(d_M^H(\psi_1)(\Theta))$. For any solid angle $\Omega_2$, with $\tau(\Omega_2) = \psi_2$, it holds that:

$$|\Gamma(\Omega_1, \Theta, \Omega)| = |\Gamma(\Omega_1, \text{diag}\{a_M^H(\Omega_2)\Theta\}, \Omega')|$$

where $\tau(\Omega') = \tau(\Omega) - \tau(\Omega_2)$. The identity implies that, for two uniform panel arrays with parameter matrices $\Theta$ and $\text{diag}(d_M^H(\psi_2)\Theta)$ that are excited from the same AoA $\Omega_1$, the gain patterns are just a rotation of one another, such that the gain at direction $\Omega$ for the first one is equal to the gain at the direction of $\Omega'$ for the second one. The same holds for a uniform planar array by setting $\Omega_1 = 0$, such that the gain of the two uniform planar arrays are related by a rotation of each other with the gain at a direction $\Omega$ for the first one being equal to the gain at the direction $\Omega'$ for the second one.

It can then be shown that:

$$|\Gamma(\Omega_1, \Theta, \Omega)| = |\Gamma(\Omega_2, \Theta, \Omega'')|$$

where $\tau(\Omega'') = \tau(\Omega) + \tau(\Omega_2) - \tau(\Omega_1)$. For two uniform panel arrays with the same parameters $\Theta$, excited from two different AoAs $\Omega_1$ and $\Omega_2$, the gain patterns are just a rotation of each other. The gain at direction $\Omega$ for the first one is equal to the gain at the direction $\Omega''$ for the second one. Channel reciprocity holds, where $|\Gamma(\Omega_1, \Theta, \Omega_2)| = |\Gamma(\Omega_2, \Theta, \Omega_1)|$.

Returning to the example above, there may be no line-of-sight path between the transmitter 102 and the receiver 104, while the reconfigurable intelligent surface 106 assists the channel with elements 108 that are arranged in a uniform planar array. The element 108 may identify the AoA of the received signal as well as other characteristics of the received signal. Formally, there may be N transmitter-receiver pairs, specified by $(\Omega_n, \mathcal{D}_n)$, with $n = 1 \ldots N$. The $n^{th}$ transmitter 102 emits at the reconfigurable intelligent surface 106 with an AoA of $\Omega_n$ and the $n^{th}$ receiver 104 may be within a receive zone $\mathcal{D}_n$, where $\mathcal{D}_n$ represents the range of AoDs from the reconfigurable intelligent surface 106 that may cover the $n^{th}$ receiver.

For the $n^{th}$ receive zone, each continuous range of such AoDs may be denoted by an angular coverage interval (ACI). Each receive zone may include one or more ACIs. For each transmission pair, the ideal reconfigurable intelligent surface may be configured in such a way that, when excited from solid angle $\Omega_n$, it covers the receive zone $\mathcal{D}_n$ uniformly, with high and sharp gains, while leaving minimal leakage to other intervals. The reconfigurable intelligent surface 106 may be configured to provide high quality of service to all transmitter-receiver pairs at once. In the simplest instance, there may be only a single transmitter-receiver pair.

The boundaries of the ACIs are determined based on the potential locations of the receivers 104. ACIs may be selected with minimal size to maximize the potential gain. The footprint of the receive zones on spherical coordinates may have an arbitrary shape. The region $\mathcal{B}^\psi$ may be divided into $Q = Q_v Q_h$ sub-regions, where $Q_v$ and $Q_h$ determine the division resolution in the vertical and horizontal directions, respectively. Each sub-region may be identified by a particle $\square_{p,q}^\psi$ that is specified as:

$$\square_{p,q}^\psi = v_v^p \times v_h^q, \ p \in [Q_v], \ q \in [Q_h]$$

where $v_v^p = [\xi^{p-1}, \xi^p]$ and $v_h^q = [\zeta^{q-1}, \zeta^q]$, $\xi^p = -\xi^B + p\delta_v$ and $\zeta^q = -\zeta^B + q\delta_h$, and where $\delta_v = 2\xi^B/Q_v$ and $\delta_h = 2\zeta^B/Q_h$. For all $(p, q)$, $\delta_{p,q} = \delta_v \delta_h$.

To cover each receive zone $\mathcal{D}_n$ with the smallest set of particles, $\mathcal{D}_n \sim \cup_{(p,q) \in \mathcal{A}_n} \mathcal{B}_{p,q}^\psi$, with $\mathcal{A}_n$ being the smallest set of index pairs $(p, q)$ that beams $\mathcal{B}_{p,q}^\psi$ collectively cover $\mathcal{D}_n$. The union of $\mathcal{B}_{p,q}^\psi$ approximates the shape of the desired receive zone $\mathcal{D}_n$, where the resolution of the approximation is set by the pair $(Q_v, Q_h)$.

By using larger values of $Q_v$ and $Q_h$, finer particles can be used to boost the quality of the approximation of the expense of solving a larger optimization problem:

$$\mathcal{A}_n = \arg \min_{\{\mathcal{A} | \mathcal{D}_n \subseteq \cup_{(p,q) \in \mathcal{A}} \mathcal{B}_{p,q}\}} |\hat{\mathcal{A}}|, \ n = 1, \ldots, N$$

where $\mathcal{A} = \cup_{n=1}^N \mathcal{A}_n$.

Every instance of a multiple-transmitter-multiple-receiver system can be reframed as a single-transmitter-multiple-receiver (SMTR) system. The two-way communications in the SMTR case is posed as a composite beamforming problem under the uniform planar array antenna structure. A low-complexity closed-form solution is provided to this problem. In a single-transmitter-multiple-receiver system, at least three devices (e.g., one transmitter 102 and two receivers 104) are communicating with one another. This system can then be extended to any number of transmitters 102. For example, the parameters of a composite beam may be generated by adding together respective parameters of a plurality of individual beams.

For N transmitter-receiver pairs $(\Omega_n, \mathcal{D}_n)$, where $\Omega_n$ is the AoA of the $n^{th}$ transmitter to the plane of the reconfigurable intelligent surface 106, and $\mathcal{D}_n$ denotes the $n^{th}$ receive zone:

$$|\Gamma(\Omega_n, \hat{\Theta}, \Omega)| = |\Gamma(\Omega_1, \hat{\Theta}, \tilde{\Omega})|, \ \forall n = 1, \ldots, N$$

where $\tau(\tilde{\Omega}) = \tau(\Omega) + \tau(\Omega_1) - \tau(\Omega_n)$. Under the $\psi$-domain, this means that if $\hat{\Theta}$ is optimized to cover the angular interval $\mathcal{D}_n$, when excited from an AoA of $\Omega_n$, the same configuration when excited from an AoA of $\Omega_1$ will cover the angular interval $\mathcal{D} \tilde{\mathcal{D}}_n$ that is a shifted version of $\mathcal{D}_n$, by $\tau(\Omega_1) - \tau(\Omega_n)$. The STMR two-way communications problem can be solved with transmission pair $(\Omega_1, \tilde{\mathcal{D}})$, where $\tilde{\mathcal{D}} = \cup_{n=1}^N \tilde{\mathcal{D}}_n$.

Let $\Theta^*$ be the optimal configuration of the reconfigurable intelligent surface 106 derived for solving the SMTR problem. It can be verified that $\Theta = \tilde{\Theta}^*$ is the optimal configuration for the multiple-transmitter case.

For an antenna element located at position ($m_v$, $m_h$) in the grid of the reconfigurable intelligent surface 106:

$$\lambda_{m_v,m_h} = \beta_{m_v,m_h} e^{-j(\theta_v, m_h - \tau(\Omega_1)m)}$$

where $m=[m_v, m_h]^T$, which gives the vector $\lambda$:

$$\lambda = [\lambda_{0,0}, \ldots, \lambda_{0,M_h-1}, \lambda_{1,0}, \ldots, \lambda_{M_v-1,M_h-1}]$$

Note that $\|\lambda\|_\infty = 1$ and $\lambda$ depend on the AoA of the incident beams on the reconfigurable intelligent surface 106, as well as the parameters of the surface 106. The reference gain of the surface in the direction ($\xi$, $\zeta$) in terms of $\lambda$ is given by:

$$G(\xi, \zeta, \lambda) = |(d_{M_p}(\xi) \otimes d_{M_h}(\zeta))^H \lambda|^2$$

The parameters, such as the phase shift $\theta_m$ and the attenuation value $\beta_m$ for the $m^{th}$ elements of the reconfigurable intelligent surface 106, are obtained using the corresponding coefficients of the vector $\lambda$ and the directivity vector $a_M(\Omega_1)$ for any receive incident solid angle $\Omega_1$. To design $\lambda$, the normalized beamforming vector $c = \lambda/\|\lambda\|$ can be used to compute $\lambda = c/\|c\|_\infty$. For any normalized beamforming vector $c$:

$$\int_{-\pi}^{\pi} \int_{-\pi}^{\pi} G(\xi, \zeta, c) d\xi d\zeta = (2\pi)^2$$

For the ideal gain corresponding to the beamformer $c$:

$$\int\int_{\mathcal{B}^\psi} G_{ideal,\mathcal{D}}(\xi, \zeta) d\xi d\zeta = \sum_{(p,q) \in \mathcal{A}} \delta_{p,q} t = (2\pi)^2$$

where $\delta_{p,q}$ denotes the area of the (p, q)$^{th}$ beam in the ($\xi$, $\zeta$) domain. It can be derived that $t = (2\pi)^2/|\mathcal{A}|\delta_{p,q}$. Thus:

$$G_\mathcal{D}^{ideal}(\xi, \zeta) = \frac{(2\pi)^2}{|\mathcal{A}|\delta_{p,q}} \mathbf{1}_\mathcal{D}(\xi, \zeta)$$

The optimization problem can be formulated as:

$$c_\mathcal{D}^{opt} = \arg\min_{c, \|c\|=1} \int\int_{\mathcal{B}^\psi} |G_\mathcal{D}^{ideal}(\xi, \zeta) - G((\xi, \zeta, c)| d\xi d\zeta$$

By partitioning the range of ($\xi$, $\zeta$) into pre-defined intervals and then uniformly sampling with the rate ($L_v$, $L_h$) per interval along both axes, the optimization problem can be rewritten as:

$$c_\mathcal{D}^{opt} = \lim_{L_h, L_v \to \infty} \sum_{r=1}^{Q_v} \sum_{s=1}^{Q_h} \sum_{l_v=1}^{L_v} \sum_{l_h=1}^{L_h} \frac{\delta_v \delta_h}{L_h L_v} |G_\mathcal{D}^{ideal}(\xi_{r,l_v}, \zeta_{s,l_h}) - G(\xi_{r,l_v}, \zeta_{s,l_h}, c)|$$

where $\xi_{r,l_v} = \xi^{r-1} + l_v \delta_v/L_v$ and $\zeta_{s,l_h} = \zeta^{s-1} + l_h \delta_h/L_h$.

$$c_\mathcal{D}^{opt} = \arg\min_{c, \|c\|=1} \lim_{L_h, L_v \to \infty} \frac{1}{L_h L_v} |G_\mathcal{D}^{ideal} - G(c)|$$

where $$G(c) = \delta_v \delta_h [G(\xi_{1,1}, \zeta_{1,1}, c), \ldots, G(\xi_{Q_v, L_v}, \zeta_{Q_h, L_h}, c)]^T$$

and $$G_\mathcal{D}^{ideal} = \delta_v \delta_h [G_\mathcal{D}^{ideal}(\xi_{1,1}, \zeta_{1,1}), \ldots, G_\mathcal{D}^{ideal}(\xi_{Q_v, L_v}, \zeta_{Q_h, L_h})]^T$$

Note that:

$$G_\mathcal{D}^{idea} = (2\pi)^2/|\mathcal{A}| \sum_{(p,q) \in \mathcal{A}} e_{p,q} \otimes 1_{L,1}$$

with $e_{p,q} \in \mathbb{Z}^Q$ being the standard basis vector for the (p, q)$^{th}$ axis among ($Q_v$, $Q_h$) pairs. Note that $1_{L,1} = g \odot g^*$ for any equal gain $g \in \mathbb{C}^L$ where $L = L_h L_v$. An equal-gain vector $g \in \mathbb{C}^L$ is a vector where all elements have equal absolute values (in this case, equal to 1).

Therefore:

$$G_\mathcal{D}^{ideal} = \left(\sum_{(p,q) \in \mathcal{A}} \frac{2\pi}{\sqrt{|\mathcal{A}|}} (e_{p,q} \otimes g)\right) \odot \left(\sum_{(p,q) \in \mathcal{A}} \frac{2\pi}{\sqrt{|\mathcal{A}|}} (e_{p,q} \otimes g)\right)^*$$

and $$G(c) = (D^H c) \odot (D^H c)^*$$

where $D^H = \sqrt{\delta_v \delta_h} (D_v^H \otimes D_h^H)$, and for $a \in \{v, h\}$ and $b \in [Q_a]$:

$$D_a = [D_{a,1}, \ldots, D_{a,Q_a}] \in \mathbb{C}^{M_a \times L_a Q_a}$$

where $$D_{v,b} = [d_{M_v}(\xi_{b,1}), \ldots, d_{M_v}(\xi_{b,L_v})] \in \mathbb{C}^{M_v \times L_v}$$

$$D_{h,b} = [d_{M_h}(\zeta_{b,1}), \ldots, d_{M_h}(\zeta_{b,L_h})] \in \mathbb{C}^{M_h \times L_h}$$

The optimal choice of $\mathbf{c}_\mathcal{D}$ is the solution to the following optimization problem for proper choices of $g_{p,q}$.

Given equal-gain vectors $g_{p,q} \in \mathbb{C}^L$, for (p, q) $\in \mathcal{A}$, a vector $\mathbf{c}_\mathcal{D}$ can be identified such that $$c_\mathcal{D} = \arg\min_{c, \|c\|=1} \lim_{L \to \infty} \left\| \sum_{(p,q) \in \mathcal{A}} \frac{2\pi}{\sqrt{|\mathcal{A}|}} (e_{p,q} \otimes g_{p,q}) - D^H c \right\|^2$$

To find the optimal choices of $g_{p,q}$, the following optimization problem may be solved, finding equal-gain vectors $g^*_{p,q} \in \mathbb{C}^L$, such that $$<g^*_{p,q}>_{(p,q) \in \mathcal{A}} =$$

$$\text{argmin}_{<g_{p,q}>_{(p,q) \in \mathcal{A}}} \left( \left\| \text{abs}(D^H c_\mathcal{D}) - \frac{2\pi}{\sqrt{|\mathcal{A}|}} \text{abs}\left( \sum_{(p,q) \in \mathcal{A}} e_{e,q} \otimes g_{p,q} \right) \right\|^2 \right)$$

where abs(•) denotes an element-wise absolute value of a vector.

This optimization problem can be solved as the limit of the sequence of solutions to a least-square optimization problem as L goes to infinity. For each L:

$$c_\mathcal{D}^{(L)} = \sum_{(p,q) \in \mathcal{A}} \frac{2\pi}{\sqrt{\text{Card}(\mathcal{A})}} (DD^H)^{-1} D(e_{p,q} \otimes g_{p,q})$$

-continued $$c_D^{(L)} = \sum_{(p,q)\in \mathcal{A}} \sigma(D_{v,p} \otimes D_{h,q}) g_{p,q}$$

where $$\sigma = \frac{2\pi\sqrt{\delta_v \delta_h}}{LQ\delta_v\delta_h\sqrt{\text{Card}(\mathcal{A})}} = \frac{2\pi}{LQ\sqrt{\delta_v\delta_h\text{Card}(\mathcal{A})}},$$

noting that it holds that:

$$DD^h = \delta_v\delta_h(D_v \otimes D_h)(D_v^H \otimes D_h^H) = \delta_v\delta_h LQ$$

where Card($\mathcal{A}$) is the cardinality of $\mathcal{A}$.

The minimizer of the optimization problem for $\langle g^*_{p,q}\rangle_{(p,q)\in\mathcal{A}}$ may be expressed as:

$$g^*_{p,q} = [1\alpha^\eta \ldots \alpha^{\eta(L_v-1)}\alpha^{\eta(L_h-1)}]^T, (p,q)\in \mathcal{A}$$

for some $\eta$ where $$\alpha_a = e^{j\left(\frac{\eta_a}{L_a}\right)}$$

and $a\in \{v, h\}$. An analytical form solution can be found for $c_D$, with the $(m_v, m_h)^{th}$ component of the beamformer $c_D$ being:

$$c_{D,m_v,m_h} = \sum_{(p,q)\in\mathcal{A}} \frac{2\pi}{Q} e^{j\left(\zeta_{p-1,q-1}^{m_v,m_h} + \frac{\xi_v+\xi_h}{2}\right)} \text{sinc}\left(\frac{\xi_v}{2\pi}\right)\text{sinc}\left(\frac{\xi_h}{2\pi}\right)$$

Having a closed-form expression of $c_D$, and therefore $\lambda$, the parameters for the reconfigurable intelligent surface 106 that is excited from solid angle $\Omega_1$, with cells placed at $(m_v, m_h)$, can be determined as:

$$\beta_{m_v,m_h} = \frac{|c_{D,m_v,m_h}|}{\|c\|_\infty}$$

$$\theta_{m_v,m_h} = \angle c_{D,m_v,m_h} + m_v\xi_1 + m_h\zeta_1$$

where $\angle c_{D,m_v,m_h}$ is the angle of the complex number c.

In the case that gain control (attenuation) at the reconfigurable intelligent surface 106 is not feasible, then $\beta_{m_v,m_h}=1$ is replaced by the derivation for the absolute value of the parameters of the reconfigurable intelligent surface 106.

Figure 2:
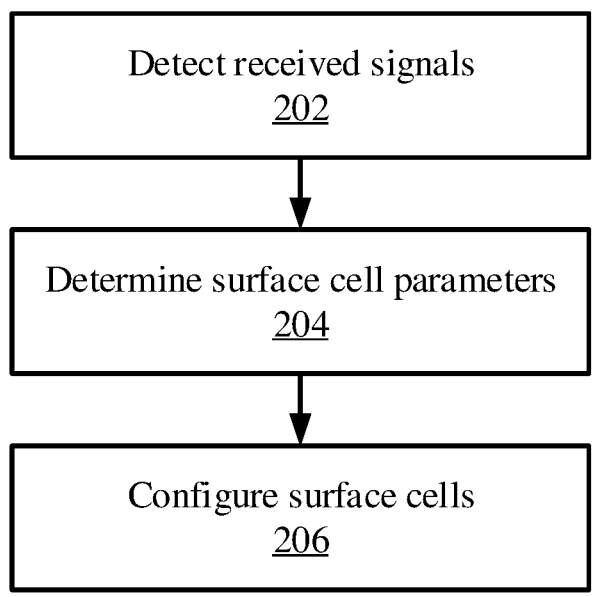
FIG. 2 is a block/flow diagram of a method for configuring cells in a reconfigurable intelligent surface, in accordance with an embodiment of the present invention.

Referring now to FIG. 2, a method for configuring the reconfigurable intelligent surface 106 is shown. Block 202 detects received signals at each cell 108 of the reconfigurable intelligent surface 106. The information gathered in block 202 may include, for example solid angles $\Omega_1$ and $\Omega_2$ between a reference surface and the transmitter 102 and the receiver 104.

Based on the received signals, which may be between multiple transmitters 102 and multiple receivers 104, block 204 determines surface cell parameters for the cells 108 of the reconfigurable intelligent surface 106. As described above, for a cell $(m_v, m_h)$, these parameters may include the gain $\beta_{m_v,m_h}$ and/or an angular direction $\theta_{m_v,m_h}$. The determined surface cell parameters correspond to a particular beam forming configuration which provides connectivity between one or more pairs of transmitters 102 and receivers 104.

Block 206 configures the surface cells 108 of the reconfigurable intelligent surface 106 in accordance with the parameters determined in block 204. When incident radio waves reflect off of the reconfigurable intelligent surface 106, they do so with a gain determined by the beam forming pattern set by the parameters. Because the beam forming pattern may be selected to provide gain improvements for multiple different connections, the reconfigurable intelligent surface 106 can provide a reflective surface that accommodates incident beams at multiple different angles.

Figure 3:
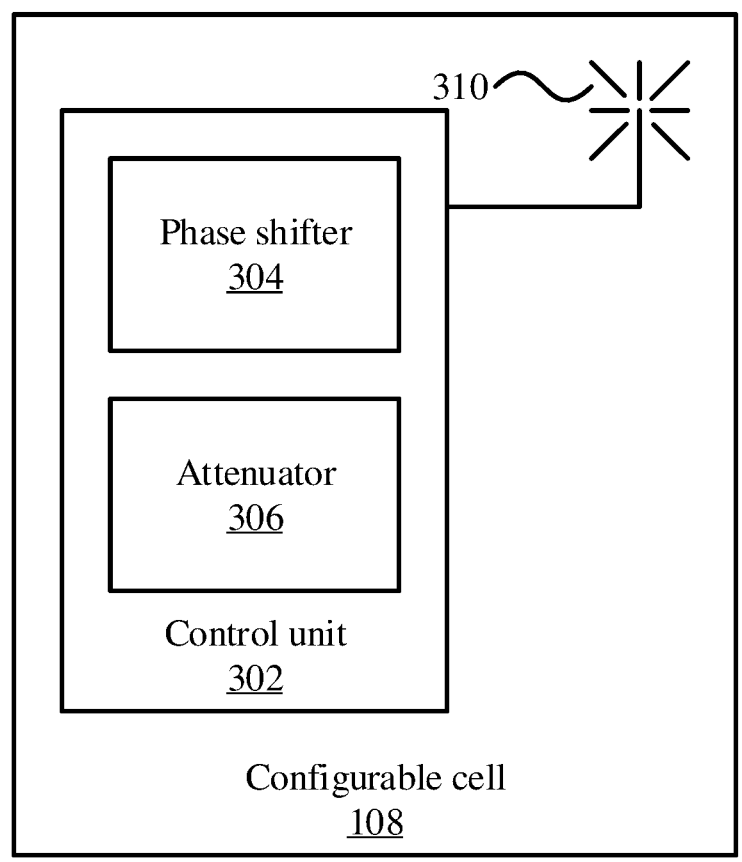
FIG. 3 is a diagram of a configurable cell within a reconfigurable intelligent surface, in accordance with an embodiment of the present invention.

Referring now to FIG. 3, a diagram of a cell 108 of the reconfigurable intelligent surface 106 is shown. In some implementations, the reconfigurable intelligent surface includes multiple elements that are arranged in a particular shape. For example in 106 the elements may be configured side-by-side in a two dimensional array. Each element is capable of receiving a signal and reflecting or retransmitting a signal. The reflected signal from an element is a function of the received signal by that element.

In some embodiments, the gain, the phase, or both the gain and the phase of the received signal may adjusted through a control unit before the signal is reflected. The configurable cell 108 may therefore include an antenna 310 which receives and retransmits incident signals, as well as a control unit 302. The control unit 302 controls the parameters of the configurable cell 108 in accordance with a beamforming pattern of the reconfigurable intelligent surface 106. Thus, the control unit 302 may include a phase shifter 304 and an attenuator 306.

A passive element may only change the phase of the signal or attenuate the signal before reflection. The change in the phase and gain of the signal of each cell may be represented by the gain and a phase of a complex number. This complex number may be referred to as beamforming coefficient of this cell. The control unit adjusts the beamforming coefficients of the reconfigurable intelligent surface 106 to change the reflection properties of the combined beam which is transmitted from multiple elements of the reconfigurable intelligent surface array.

Figure 4:
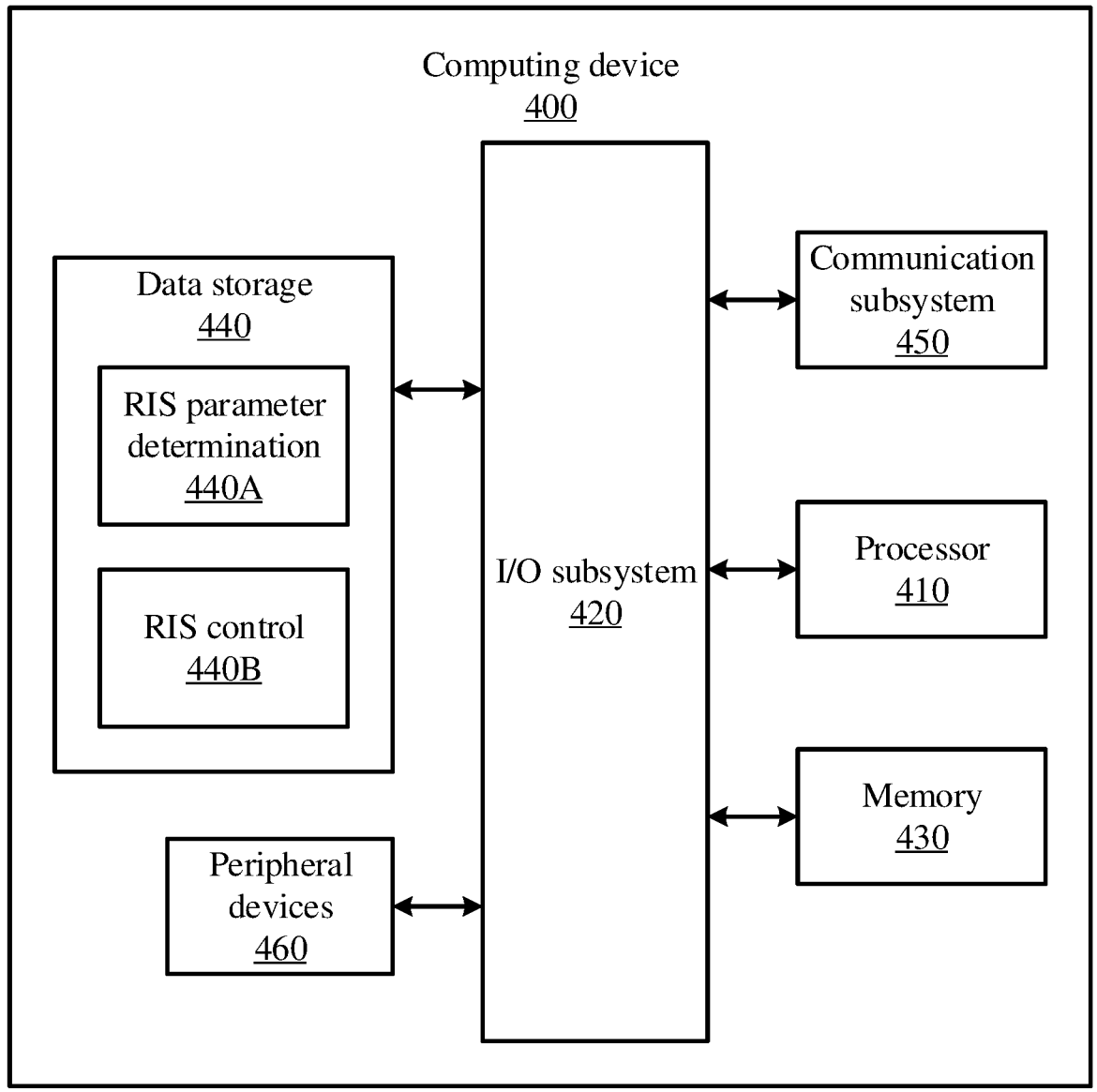
FIG. 4 is a computing system that can configure a reconfigurable intelligent surface, in accordance with an embodiment of the present invention.

Referring now to FIG. 4, an exemplary computing device 400 is shown, in accordance with an embodiment of the present invention. The computing device 400 is configured to perform classifier enhancement.

The computing device 400 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 400 may be embodied as a one or more compute sleds, memory sleds, or other racks, sleds, computing chassis, or other components of a physically disaggregated computing device.

As shown in FIG. 4, the computing device 400 illustratively includes the processor 410, an input/output subsystem 420, a memory 430, a data storage device 440, and a communication subsystem 450, and/or other components and devices commonly found in a server or similar computing device. The computing device 400 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 430, or portions thereof, may be incorporated in the processor 410 in some embodiments.

The processor 410 may be embodied as any type of processor capable of performing the functions described herein. The processor 410 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 430 may be embodied as any type of volatile or non-volatile memory or data storage capable of performing the functions described herein. In operation, the memory 430 may store various data and software used during operation of the computing device 400, such as operating systems, applications, programs, libraries, and drivers. The memory 430 is communicatively coupled to the processor 410 via the I/O subsystem 420, which may be embodied as circuitry and/or components to facilitate input/output operations with the processor 410, the memory 430, and other components of the computing device 400. For example, the I/O subsystem 420 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 420 may form a portion of a system-on-a-chip (SOC) and be incorporated, along with the processor 410, the memory 430, and other components of the computing device 400, on a single integrated circuit chip.

The data storage device 440 may be embodied as any type of device or devices configured for short-term or long-term storage of data such as, for example, memory devices and circuits, memory cards, hard disk drives, solid state drives, or other data storage devices. The data storage device 440 can store program code 440A for determining the parameters to be used for the cells 108 of a reconfigurable intelligent surface 106 and 440B for controlling the cells 108 of the reconfigurable intelligent surface 106. The communication subsystem 450 of the computing device 400 may be embodied as any network interface controller or other communication circuit, device, or collection thereof, capable of enabling communications between the computing device 400 and other remote devices over a network. The communication subsystem 450 may be configured to use any one or more communication technology (e.g., wired or wireless communications) and associated protocols (e.g., Ethernet, InfiniB and®, Bluetooth®, Wi-Fi®, WiMAX, etc.) to effect such communication.

As shown, the computing device 400 may also include one or more peripheral devices 460. The peripheral devices 460 may include any number of additional input/output devices, interface devices, and/or other peripheral devices. For example, in some embodiments, the peripheral devices 460 may include a display, touch screen, graphics circuitry, keyboard, mouse, speaker system, microphone, network interface, and/or other input/output devices, interface devices, and/or peripheral devices.

Of course, the computing device 400 may also include other elements (not shown), as readily contemplated by one of skill in the art, as well as omit certain elements. For example, various other sensors, input devices, and/or output devices can be included in computing device 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 400 are readily contemplated by one of ordinary skill in the art given the teachings of the present invention provided herein.

Figure 5:
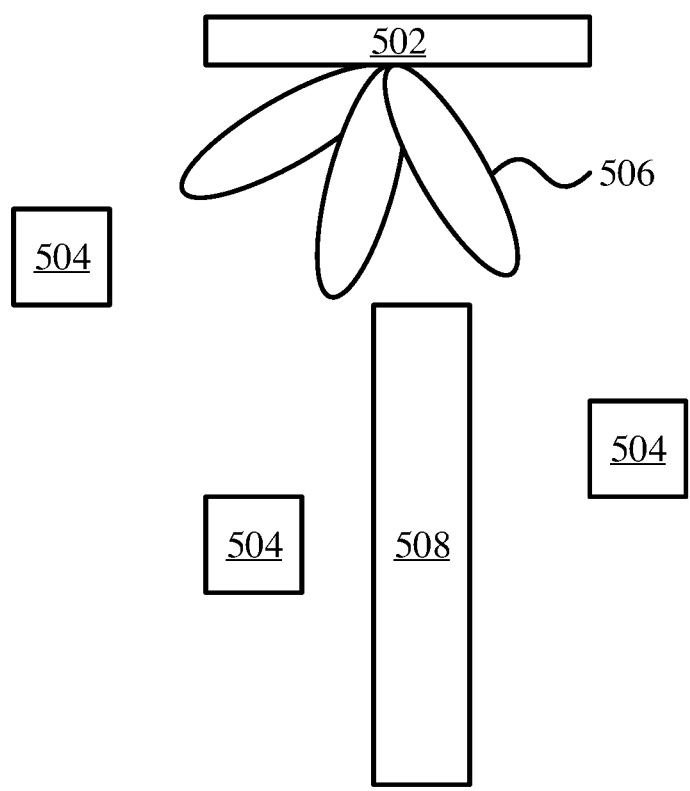
FIG. 5 is a diagram of an environment that includes a reconfigurable intelligent surface and multiple user terminals, in accordance with an embodiment of the present invention.

Referring now to FIG. 5, an exemplary reconfigurable intelligent surface 502 is shown in the context of multiple user terminals 504. The user terminals 504 are positioned in an environment around the surface 502, where the environment may also include obstacles 508 which are opaque to the frequencies that the terminals 504 use for communications. Such obstacles 508 may include fixed obstacles such as walls and furniture, but may also include mobile obstacles such as people.

The surface 502 may determine a composite beam pattern 506 that includes lobes which are directed to each of the respective terminals 504. The lobes of the composite beam pattern 506 provide a signal path for the user terminals 504 that may avoid obstacles 508, thereby providing superior signal strength in such an environment.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for configuring a surface, comprising:
measuring properties of one or more incident signals at a configurable cell of a surface that includes configurable cells in an array of height v and width h;
determining a beam forming pattern for the surface based on the measured properties of the one or more incident signals;
determining a gain parameter for the configurable cell as:

$$\beta_{m_v}, m_h = \frac{|c_{\mathcal{D}, m_v, m_h}|}{\|c\|_\infty}$$

where $m_v$, $m_h$ designates a location of the configurable cell in the array, $C_{\mathcal{D}, m_v, m_h}$ designates a beamforming vector of the configurable cell, and c is a beamforming vector of the surface;
determining a phase shift parameter for the configurable cell as:

$$\theta_{m_v, m_h} = \angle c_{\mathcal{D}, m_v, m_h}$$

where $\angle C_{\mathcal{D}, m_v, m_h}$ is an angle of the beamforming vector of the configurable cell; and
setting the gain parameter and the phase shift parameter of the configurable cell to implement the beam forming pattern in the surface.

2. The method of claim 1, wherein the one or more incident signals include communication signals between three or more devices.

3. The method of claim 2, wherein the one or more incident signals include signals between at least one transmitter and at least two receivers.

4. The method of claim 3, wherein the beam forming pattern includes a composite beam having a plurality of disjoint beam lobes, wherein the at least two receivers are physically disjoint and are covered by different respective disjoint beam lobes of the composite beam.

5. The method of claim 2, wherein different pairs of the three or more devices communicate through the surface at once.

6. The method of claim 5, wherein a pair of communication devices comprised of a transmitter and a receiver, and plurality of transmitters with plurality of incident angles are communicating with corresponding plurality of receivers with plurality of reflecting angles.

7. The method of claim 6, wherein a surface parameter is set to concurrently reflect an incident signal from a first transmitter of the plurality of transmitters toward a first receiver of the plurality of receivers and an incident signal from a second transmitter of the plurality of transmitters toward a second receiver of the plurality of receivers.

8. The method of claim 1, wherein the surface includes a plurality of configurable cells arranged in a uniform planar array.

9. The method of claim 1, wherein the parameters of the configurable cell include a complex number, and wherein setting the parameters of the configurable cell includes adding together corresponding parameters of a plurality of beams that have disjoint angular coverage intervals.

10. A reconfigurable surface, comprising:
configurable cells in an array of height v and width h
a hardware processor configured to determine a beam forming pattern based on properties of one or more incident signals;
a control unit configured to set parameters of a configurable cell at location $m_v$, $m_h$ to implement the beam forming pattern in the surface, including a gain parameter and a phase shift parameter, with the gain parameter being determined as:

$$\beta_{m_v}, m_h = \frac{|c_{\mathcal{D},m_v,m_h}|}{\|c\|_\infty}$$

where $m_v$, $m_h$ designates a location of the configurable cell in the array, $C_{\mathcal{D},m_v,m_h}$ designates a beamforming vector of the configurable cell, and e is a beamforming vector of the surface, and with the phase shift parameter being determined as:

θmv,mh=∠$C_{\mathcal{D},m_v,m_h}$ where $\angle C_{\mathcal{D},m_v,m_h}$ is an angle of the beamforming vector of the configurable cell.

11. The surface of claim 10, wherein the one or more incident signals include communication signals between three or more devices.

12. The surface of claim 11, wherein the one or more incident signals include signals between at least one transmitter and at least two receivers.

13. The surface of claim 12, wherein the beam forming pattern includes a composite beam having a plurality of disjoint beam lobes, wherein the at least two receivers are physically disjoint and are covered by different respective disjoint beam lobes of the composite beam.

14. The surface of claim 11, wherein different pairs of the three or more devices communicate through the surface at once.

15. The surface of claim 14, wherein a plurality of transmitters with a respective plurality of incident angles communicate with a corresponding plurality of receivers with a plurality of respective reflecting angles.

16. The surface of claim 15, wherein a surface parameter is set to concurrently reflect an incident signal from a first transmitter of the plurality of transmitters toward a first receiver of the plurality of receivers and an incident signal from a second transmitter of the plurality of transmitters toward a second receiver of the plurality of receivers.

17. The surface of claim 10, further comprising a plurality of configurable cells arranged in a uniform planar array.

18. The surface of claim 10, wherein the parameters of the configurable cell include a complex number, and wherein hardware processor is further configured to determine the parameters of the configurable cell by adding together corresponding parameters of a plurality of beams that have disjoint angular coverage intervals.

19. The surface of claim 10, wherein each configurable cell includes an attenuator and an antenna.

* * * * *